May 20, 1941.       O. M. WHITTEN       2,242,733
BRAKE
Filed Nov. 27, 1939

INVENTOR.
OWEN M. WHITTEN
BY
ATTORNEYS

Patented May 20, 1941

2,242,733

UNITED STATES PATENT OFFICE 2,242,733

BRAKE

Owen M. Whitten, Detroit, Mich., assignor to Kelsey-Hayes Wheel Company, Detroit, Mich., a corporation of Delaware Application November 27, 1939, Serial No. 306,404

7 Claims. (Cl. 188—79.5)

The invention relates to brakes and refers more particularly to internal expanding brakes.

The invention has for an object to provide an improved construction of adjustable anchor for the friction device whereby the latter may be readily adjusted to compensate for wear and also readily centered.

The invention has for another object to form the anchor of two eccentrics which may be individually adjusted to different rotative positions.

The invention has for a further object to form the anchor of two eccentrics for individually adjusting different friction elements of the friction device.

Figure 1:
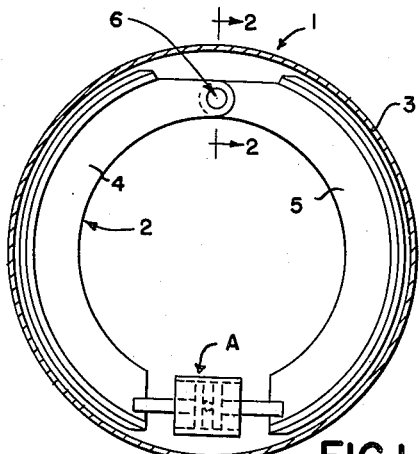
Figure 2:
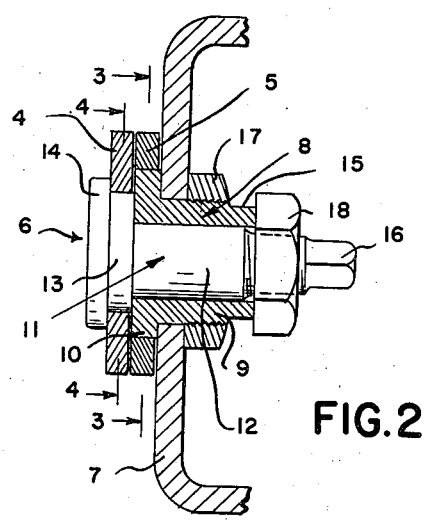
Figure 4:
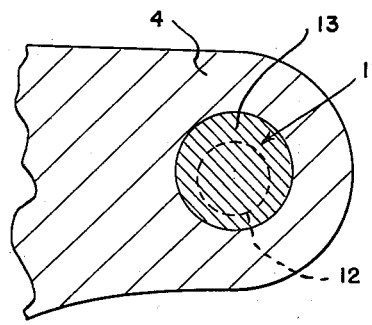
Figure 3:
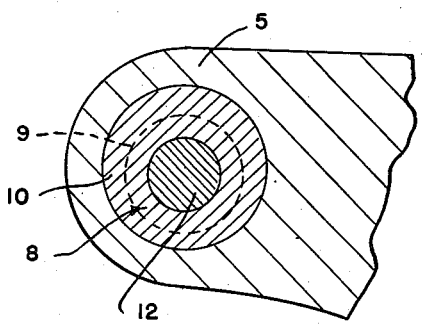
Figure 5:
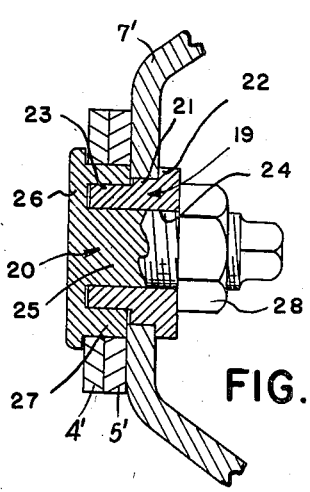
Figure 6:
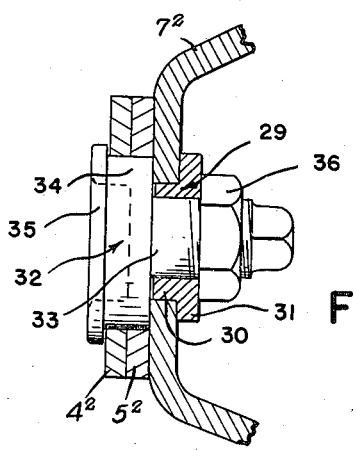

These and other objects of the invention will become apparent from the following description, taken in connection with the accompanying drawing, in which Figure 1 is a sectional view inside the web of a brake drum and showing in elevation a friction device embodying the invention;

Figure 2 is a cross section on the line 2—2 of Figure 1;

Figures 3 and 4 are cross sections on the lines 3—3 and 4—4, respectively, of Figure 2;

Figures 5 and 6 are views similar to Figure 2 illustrating modified constructions of anchors.

As illustrated in Figure 1, the brake comprises the brake drum 1 and the friction device 2. The brake drum is adapted to be secured to a vehicle wheel hub and has the annular brake flange 3, the inner face of which is adapted to be engaged by the friction elements 4 and 5 which form the friction device 2. 6 is an adjustable anchor mounted upon the supporting or backing plate 7 and engaged by adjacent ends of the friction elements 4 and 5. A is a suitable actuator also mounted upon the supporting or backing plate and operatively connected to the other ends of the friction elements and adapted to spread these ends apart to engage the friction elements with the annular braking flange. The actuator A, as shown, is a hydraulic wheel cylinder which may be of standard construction.

As shown more particularly in Figures 2, 3 and 4, the adjustable anchor comprises the eccentric 8 having the cylindrical portion 9 extending through the supporting or backing plate 7 and the radial eccentric portion 10 located at the inner side of the supporting or backing plate. The anchor also comprises the eccentric 11 having the cylindrical shank 12 extending through and journaled in the cylindrical portion 9, the radial eccentric portion 13 at the inner side of the radial eccentric portion 10, and the enlarged head 14 inwardly beyond the radial eccentric portion 13. The eccentric portion 13 engages the adjacent end of the friction element 4, the enlarged head 14 and the radial eccentric portion 10 forming an annular space surrounding the eccentric portion 13 for guiding the end of the friction element 4. The end of the friction element 4 forms with the supporting or backing plate an annular space surrounding the eccentric portion 10 for guiding the end of the friction element 5 which engages the eccentric portion 10.

The ends of the cylindrical portion 9 and shank 12 outside the brake drum and supporting or backing plate are suitably formed to be engaged by tools, such as wrenches, to rotatably adjust the eccentrics. As shown, the ends are formed with the flat faces 15 and 16, respectively. For locking the eccentrics in their various positions of rotative adjustment, the cylindrical portion 8 is externally threaded and is adapted to be engaged by the nut 17 and the shank 12 inwardly beyond its flatted faces is externally threaded for engagement by the nut 18. The nut is adapted to clamp the eccentric portion 10 against the supporting or backing plate and the nut 18 is adapted to clamp the eccentric portion 13 against the eccentric portion 10.

With this construction, it will be seen that the eccentrics form anchors for the friction elements and may be individually adjusted to different rotative positions and also are adapted to individually adjust the friction elements to different positions in the brake drum to center the friction elements.

As illustrated in Figure 5, the brake anchor is formed of the two eccentrics 19 and 20. The eccentric 19 has the externally eccentric surface 21 forming the eccentric portion. This eccentric portion is located intermediate the ends of the eccentric and, more particularly, between the enlarged portion 22 and the reduced portion 23. The eccentric portion 21 is engageable with the boundary of the opening formed in the supporting or backing plate 7' for receiving the anchor. The eccentric 19 also has the cylindrical inner surface 24. The eccentric 20 has the cylindrical shank 25 extending through the eccentric 19 and engaging its inner surface 24, the enlarged head 26 at the inner end of the shank, and the annular flange 27 extending from the head to the supporting or backing plate. The annular flange forms the eccentric portion of the eccentric 20, the inner surface of the flange being cylindrical and engaging the reduced portion 23 and the outer surface of the flange being eccentric to the inner surface. The annular flange forming the eccentric is engaged by the adjacent ends of both of the friction elements 4' and 5' and these friction elements are held in lateral position between the head 26 and the supporting or backing plate. The ends of both eccentrics 19 and 20 outside the brake drum and the supporting or backing plate are formed for engagement by suitable tools, such as wrenches, and, as shown, are formed with flatted faces the same as illustrated particularly in Figure 2. 28 is a clamping nut threaded upon the shank 25 and abutting the eccentric 19 for clamping the enlarged portion 22 of this eccentric and the lateral flange 27 of the eccentric 20 against the outside and inside respectively of the supporting or backing plate to thereby secure the eccentrics in their relative positions of rotative adjustment.

With this construction the eccentrics may be individually adjusted to different rotative positions to simultaneously adjust the friction elements to different positions in the brake drum to center the friction elements.

The anchor illustrated in Figure 6 comprises the eccentric 29 having an L-shaped cross section, the axial portion 30 of which forms the eccentric engageable with the boundary of the opening through the supporting or backing plate 7². The radial portion 31 extends along the outside of the supporting or backing plate and is adapted to be clamped thereagainst. The anchor also comprises the eccentric 32 which has the shank 33 extending through and journaled in the eccentric 29 and the enlarged eccentric portion 34 abutting the inside of the supporting or backing plate and adapted to engage both of the friction elements 4² and 5². The eccentric 32 has the enlarged head 35 which cooperates with the supporting or backing plate to laterally position the adjacent ends of the friction elements. The radial portion 31 and the end of the shank 33 are formed as by being flatted for engagement by a suitable tool, such as a wrench, to rotatably adjust the eccentrics. The eccentrics are adapted to be clamped in their rotative positions by the nut 36 threaded upon the shank 33 and clamping the radial portion 31 and the eccentric portion 34 against the outside and inside respectively of the supporting or backing plate.

With this construction, the eccentrics may also be individually adjusted to different rotative positions to simultaneously adjust the friction elements relative to the brake drum.

What I claim as my invention is:

1. A brake, comprising a brake drum, a friction device within said drum and an adjustable anchor for centering said friction device with respect to said brake drum, said anchor comprising a rotatably adjustable eccentric, a second eccentric rotatably adjustably mounted on said first mentioned eccentric, and means for securing said eccentrics in their relative positions of rotative adjustment.

2. A brake, comprising a supporting plate, a friction device carried thereby and an adjustable anchor for said friction device, said anchor comprising an eccentric rotatably adjustably mounted on said plate, a second eccentric rotatably adjustably mounted on said first mentioned eccentric, and means for securing said eccentrics in their relative positions of rotative adjustment relative to said plate.

3. A brake, comprising a supporting plate, friction elements carried by said plate, and an adjustable anchor for said friction elements, said anchor comprising an eccentric rotatably adjustably mounted on said plate, a second eccentric rotatably adjustably mounted on said first mentioned eccentric, and means for clamping one of said eccentrics against said plate to hold said eccentric in its adjusted position of rotation and for securing the other of said eccentrics in its adjusted position of rotation relative to said first mentioned eccentric.

4. A brake, comprising a supporting plate, friction elements carried thereby and an adjustable anchor for said friction elements, said anchor comprising an eccentric rotatably adjustably mounted on said plate, a second eccentric rotatably adjustably mounted on said first mentioned eccentric, and means for clamping said eccentrics against said plate to hold the same in their relative positions of rotative adjustment.

5. A brake, comprising a supporting plate, friction elements carried thereby and an adjustable anchor for said friction elements, said anchor comprising an eccentric rotatably adjustably mounted on said plate and operatively connected to one of said friction elements, and a second eccentric rotatably adjustably mounted on said first mentioned eccentric and operatively connected to the other of said friction elements.

6. A brake, comprising friction elements and an adjustable anchor unit therefor, said anchor unit comprising a rotatably adjustable eccentric operatively connected to one of said friction elements, and a second eccentric rotatably adjustably mounted on said first mentioned eccentric and operatively connected to another of said friction elements.

7. A brake, comprising a supporting plate, friction elements carried thereby and an adjusting anchor for said friction elements, said anchor comprising an eccentric rotatably adjustably mounted on said plate, a second eccentric rotatably adjustably mounted on said first mentioned eccentric, each of said eccentrics being individually engageable with one of said friction elements, means for clamping said first mentioned eccentric to said plate, and means for clamping said second mentioned eccentric to said first mentioned eccentric.

OWEN M. WHITTEN.